United States Patent
Higaki

(10) Patent No.: US 11,526,962 B2
(45) Date of Patent: Dec. 13, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshinari Higaki, Atsugi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 16/879,180

(22) Filed: May 20, 2020

(65) Prior Publication Data

US 2020/0372612 A1  Nov. 26, 2020

(30) Foreign Application Priority Data

May 24, 2019 (JP) .............................. JP2019-097496

(51) Int. Cl.
*G06T 5/00* (2006.01)

(52) U.S. Cl.
CPC .... *G06T 5/002* (2013.01); *G06T 2207/10016* (2013.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2010/0302447 A1* 12/2010 Shirai ................ H04N 21/4122
  348/E5.119
2012/0069171 A1* 3/2012 Kodaira ............... G02B 21/365
  348/79

OTHER PUBLICATIONS

Yue et al. "High ISO JPEG Image Denoising by Deep Fusion of Collaborative and Convolutional Filtering", Date of publication Apr. 9, 2019). (Year: 2019).*
Chen et al. "Learning to See in the Dark", arXiv:1805.01934v1 [cs.CV] May 4, 2018) (Year: 2018).*
Nikon, "Understanding ISO Sensitivity " 5th paragraph, Achive.org, "https://web.archive.org/web/20190330032403/https://www.nikonusa.com/en/learn-and-explore/a/tips-and-techniques/understanding-iso-sensitivity.html" Mar. 29, 2019 (Year: 2019).*

(Continued)

*Primary Examiner* — Randolph I Chu
(74) *Attorney, Agent, or Firm* — Carter, DeLuca & Farrell LLP

(57) ABSTRACT

An image processing apparatus in an embodiment retains combination data showing a combination of multiple pieces of noise reduction processing for each of multiple noise levels and associating a parameter for the multiple noise levels with at least either a combination of neural networks to be applied in multiple neural networks or the number of applications of the neural networks. The apparatus also determines, based on information on a noise level obtained from a processing target image, a combination of pieces of noise reduction processing for the processing target image from the combination data. Additionally, the apparatus executes, based on data on the determined combination of pieces of noise reduction processing, the noise reduction processing using at least one of the multiple neural networks for the processing target image.

18 Claims, 10 Drawing Sheets

| ISO SENSITIVITY | CASE OF PRIORITIZING IMAGE QUALITY | CASE OF PRIORITIZING SPEED |
|---|---|---|
| 1600 | ONE-TIME APPLICATION OF NN FOR ISO 1600 | ONE-TIME APPLICATION OF NN FOR ISO 1600 |
| 3200 | ONE-TIME APPLICATION OF NN FOR ISO 3200 | ONE-TIME APPLICATION OF NN FOR ISO 3200 |
| 6400 | FOUR-TIMES APPLICATION OF NN FOR ISO 1600 | TWO-TIMES APPLICATION OF NN FOR ISO 3200 |
| 12800 | EIGHT-TIMES APPLICATION OF NN FOR ISO 1600 | FOUR-TIMES APPLICATION OF NN FOR ISO 3200 |

501

| VALUE OF MODEL PARAMETER a | CASE OF PRIORITIZING IMAGE QUALITY | CASE OF PRIORITIZING SPEED |
|---|---|---|
| MORE THAN OR EQUAL TO 0.5c AND LESS THAN 1.5c | ONE-TIME APPLICATION OF NN FOR $a = c$ | ONE-TIME APPLICATION OF NN FOR $a = c$ |
| MORE THAN OR EQUAL TO 1.5c AND LESS THAN 2.5c | ONE-TIME APPLICATION OF NN FOR $a = 2c$ | ONE-TIME APPLICATION OF NN FOR $a = 2c$ |
| MORE THAN OR QUAL TO 2.5c AND LESS THAN 3.5c | THREE-TIMES APPLICATION OF NN FOR $a = c$ | ONE-TIME APPLICATION OF NN FOR $a = c$ AND ONE-TIME APPLICATION OF NN FOR $a = 2c$ |
| MORE THAN OR EQUAL TO 3.5c AND LESS THAN 4.5c | FOUR-TIMES APPLICATION OF NN FOR $a = c$ | TWO-TIMES APPLICATION OF NN FOR $a = 2c$ |

502

(56) References Cited

OTHER PUBLICATIONS

K. Zhang, W. Zuo, Y. Chen, D. Meng, and L. Zhang, "Beyond a Gaussian Denoiser: Residual Learning of Deep CNN for Image Denoising," IEEE Trans. Image Process., vol. 26, No. 7, pp. 3142-3155, Jul. 2017.

A. Foi, M. Trimeche, V. Katkovnik, and K. Egiazarian, "Practical Poissonian-Gaussian noise modeling and fitting for single-image raw-data," IEEE Trans. Image process., vol. 17, No. 10, pp. 1737-1754, Nov. 2008.

* cited by examiner

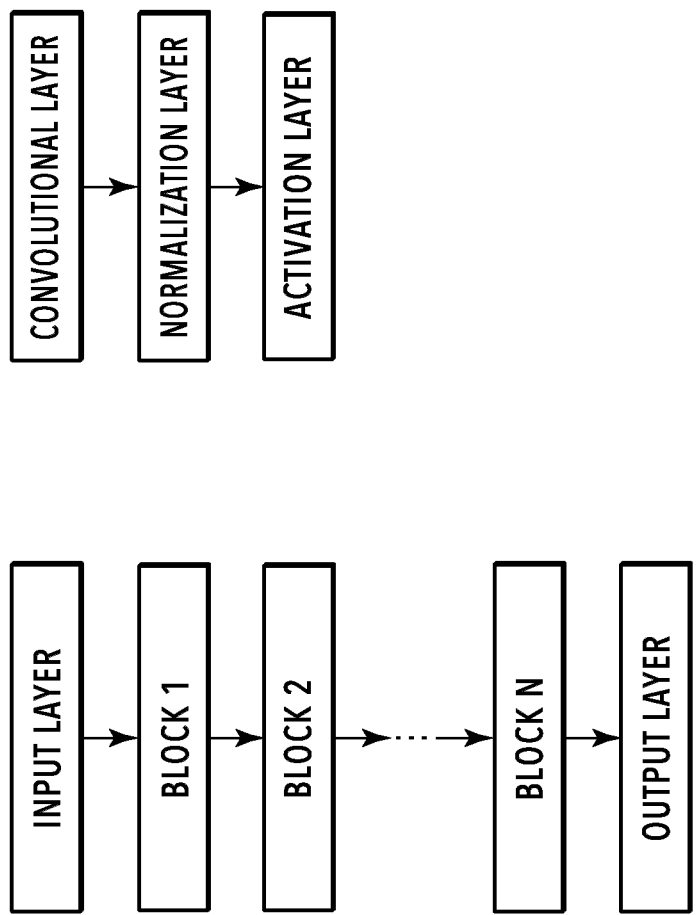
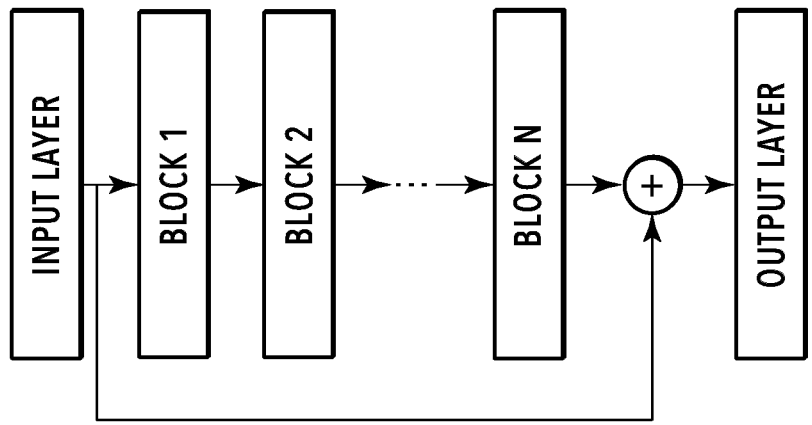

| ISO SENSITIVITY | CASE OF PRIORITIZING IMAGE QUALITY | CASE OF PRIORITIZING SPEED |
|---|---|---|
| 1600 | ONE-TIME APPLICATION OF NN FOR ISO 1600 | ONE-TIME APPLICATION OF NN FOR ISO 1600 |
| 3200 | ONE-TIME APPLICATION OF NN FOR ISO 3200 | ONE-TIME APPLICATION OF NN FOR ISO 3200 |
| 6400 | FOUR-TIMES APPLICATION OF NN FOR ISO 1600 | TWO-TIMES APPLICATION OF NN FOR ISO 3200 |
| 12800 | EIGHT-TIMES APPLICATION OF NN FOR ISO 1600 | FOUR-TIMES APPLICATION OF NN FOR ISO 3200 |

FIG.5A

| VALUE OF MODEL PARAMETER a | CASE OF PRIORITIZING IMAGE QUALITY | CASE OF PRIORITIZING SPEED |
|---|---|---|
| MORE THAN OR EQUAL TO $0.5c$ AND LESS THAN $1.5c$ | ONE-TIME APPLICATION OF NN FOR $a = c$ | ONE-TIME APPLICATION OF NN FOR $a = c$ |
| MORE THAN OR EQUAL TO $1.5c$ AND LESS THAN $2.5c$ | ONE-TIME APPLICATION OF NN FOR $a = 2c$ | ONE-TIME APPLICATION OF NN FOR $a = 2c$ |
| MORE THAN OR EQUAL TO $2.5c$ AND LESS THAN $3.5c$ | THREE-TIMES APPLICATION OF NN FOR $a = c$ | ONE-TIME APPLICATION OF NN FOR $a = c$ AND ONE-TIME APPLICATION OF NN FOR $a = 2c$ |
| MORE THAN OR EQUAL TO $3.5c$ AND LESS THAN $4.5c$ | FOUR-TIMES APPLICATION OF NN FOR $a = c$ | TWO-TIMES APPLICATION OF NN FOR $a = 2c$ |

FIG.5B

IMAGE PROCESSING APPARATUS, IMAGE PROCESSING METHOD, AND STORAGE MEDIUM

BACKGROUND OF THE INVENTION

Field of the Invention

The present invention relates to a technique for reducing noise in an image.

Description of the Related Art

In recent years, a deep neural network (DNN) has been applied to a large number of image restoration applications. The deep neural network specifically refers to a neural network having two or more hidden layers. The deep neural network has achieved higher performance by having a larger number of hidden layers. The image restoration specifically refers to processing for restoration from a deteriorated image to an original image, for example, noise removal, blur removal, super-resolution, and defect complementation. It has been known that although the DNN in the image restoration shows restoration performance higher than that in conventional methods with respect to image deterioration that can be represented by particular parameters, a single neural network shows lower restoration performance with respect to various kinds of image deterioration. For example, for noise removal, in a case where the noise level of an image used in neural network learning is single or falls within a sufficiently narrow range, the noise of an image with a noise level identical to that in the learning is removed well. However, for an image with a noise level different from that of the image used in the learning, only an insufficient noise removal effect is obtained.

Thus, in order for a single neural network to cope with multiple images having different noise levels, a known method includes subjecting the neural network to learning in a state where multiple images having different noise levels are mixed (K. Zhang, W. Zuo, Y. Chen, D. Meng, and L. Zhang, "Beyond a Gaussian Denoiser: Residual Learning of Deep CNN for Image Denoising," IEEE Trans. Image Process, Vol. 26, No. 7, pp. 3142-3155, 2017). In this method, a noise removal effect is obtained for an image having noise with any of the noise levels of images used in learning. However, this method lowers image quality as compared with a case where noise is removed by using a neural network subjected to learning at a noise level that is single and identical to the noise level of a processing target image. Thus, to avoid the lowering of image quality, it is necessary to prepare multiple neural networks individually subjected to learning for each of all the noise levels of processing target images and then use the neural networks according to the noise level of a processing target image.

However, in preparing neural networks that have been subjected to learning for each of all the noise levels, such preparation increases computation cost therefor and a storage area needed to store parameters for the neural networks. Consequently, a device and an environment for implementing the neural networks are constrained.

An object of the present invention is to reduce the number of neural networks to be used and also perform, on images with various noise levels, noise reduction for high image quality.

SUMMARY OF THE INVENTION

In an embodiment of the present invention, an image processing apparatus that executes noise reduction processing for an image by using multiple neural networks subjected to learning of results obtained by executing the noise reduction processing on images each having a predetermined noise level includes a retaining unit configured to retain combination data showing a combination of multiple pieces of noise reduction processing for each of multiple noise levels, the combination data associating a parameter for the multiple noise levels with at least either a combination of neural networks to be applied in the multiple neural networks or the number of applications of the neural networks; an obtaining unit configured to obtain information on the noise levels from a processing target image; a determination unit configured to determine, based on the obtained information on the noise levels, a combination of pieces of noise reduction processing for the processing target image from the combination data retained by the retaining unit; and an execution unit configured to execute, based on data on the combination of pieces of noise reduction processing determined by the determination unit, the noise reduction processing using at least one of the multiple neural networks for the processing target image.

Further features of the present invention will become apparent from the following description of exemplary embodiments with reference to the attached drawings.

BRIEF DESCRIPTION OF THE DRAWINGS

FIG. 4A is a block diagram showing an example of the structure of a neural network;

FIG. 4B is a block diagram showing an example of the structure of a neural network;

FIG. 4C is a block diagram showing an example of the structure of a neural network;

FIG. 5A shows an example of each of lookup tables in the first embodiment and a second embodiment;

FIG. 5B shows an example of each of lookup tables in the first embodiment and a second embodiment;

DESCRIPTION OF THE EMBODIMENTS

Hereinafter, with reference to the attached drawings, the present invention is explained in detail in accordance with preferred embodiments. Configurations shown in the following embodiments are merely exemplary, and the present invention is not limited to the configurations shown schematically.

First Embodiment

In the first embodiment, a description will be given of an example in which a neural network (hereinafter NN) that has been subjected to learning and is to be used in noise reduction processing and the number of executions of the noise reduction processing with the NN are determined according to an ISO sensitivity in capturing an image and then noise reduction is performed.

Figure 1:
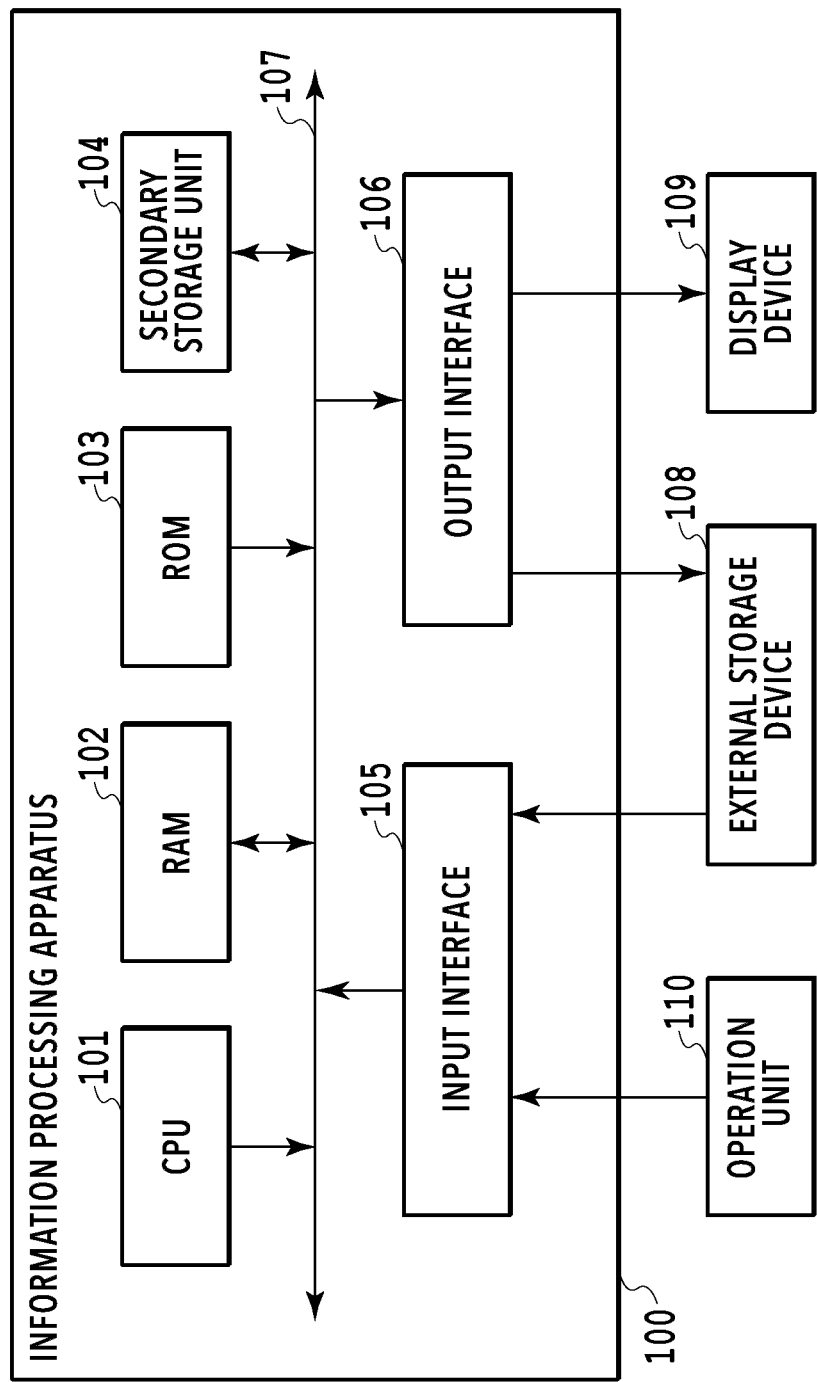
FIG. 1 is a schematic diagram showing an example of the hardware configuration of an information processing apparatus in a first embodiment.

FIG. 1 shows an example of the hardware configuration of an information processing apparatus in the present embodiment. In this embodiment, the information processing apparatus is an image processing apparatus that executes the noise reduction processing on an image.

An information processing apparatus 100 according to the present embodiment includes a CPU 101, a RAM 102, a ROM 103, a secondary storage unit 104, an input interface 105, and an output interface 106. The individual elements of the information processing apparatus 100 are interconnected by a system bus 107. Additionally, the information processing apparatus 100 is connected via the input interface 105 to an external storage device 108 and an operation unit 110. Further, the information processing apparatus 100 is connected via the output interface 106 to the external storage device 108 and a display device 109.

The CPU 101 uses the RAM 102 as a work memory to execute a program stored in the ROM 103 and exercises overall control over the individual elements of the information processing apparatus 100 via the system bus 107. Through this operation, various kinds of processing to be described later are executed. The secondary storage unit 104 is a storage unit that stores various kinds of data treated in the information processing apparatus 100, and an HDD is used in the present embodiment. The CPU 101 performs, via the system bus 107, writing of data into the secondary storage unit 104 and reading of data stored in the secondary storage unit 104. Incidentally, as the secondary storage unit 104, it is possible to use various storage devices such as an optical disk drive and a flash memory in addition to the HDD.

The input interface 105 is a serial bus interface, for example, USB or IEEE 1394. The information processing apparatus 100 receives input of data, instructions, and the like from an external device via the input interface 105. In the present embodiment, the information processing apparatus 100 obtains data via the input interface 105 from the external storage device 108 (for example, a storage medium such as a hard disk, a memory card, a CF card, an SD card, or a USB memory). Additionally, in the present embodiment, the information processing apparatus 100 obtains, via the input interface 105, user's instructions inputted in the operation unit 110. The operation unit 110, which is an input device such as a mouse or keyboard, is used to input the user's instructions.

Like the input interface 105, the output interface 106 is a serial bus interface, for example, USB or IEEE 1394. Incidentally, the output interface 106 may be a video output terminal, for example, DVI or HDMI (registered trademark). The information processing apparatus 100 outputs data and the like via the output interface 106 to the external device. In the present embodiment, the information processing apparatus 100 outputs data (for example, image data) processed by the CPU 101 via the output interface 106 to the display device 109 (various image display devices such as a liquid crystal display). Incidentally, regarding the elements of the information processing apparatus 100, there are elements other than those described above. However, a description of such elements is omitted because the elements do not constitute the main focus of the present disclosure.

Hereinafter, a description will be given of processing performed in the information processing apparatus 100 according to the present embodiment with reference to a functional block diagram shown in FIG. 2 and a flowchart shown in FIG. 3.

Figure 2:
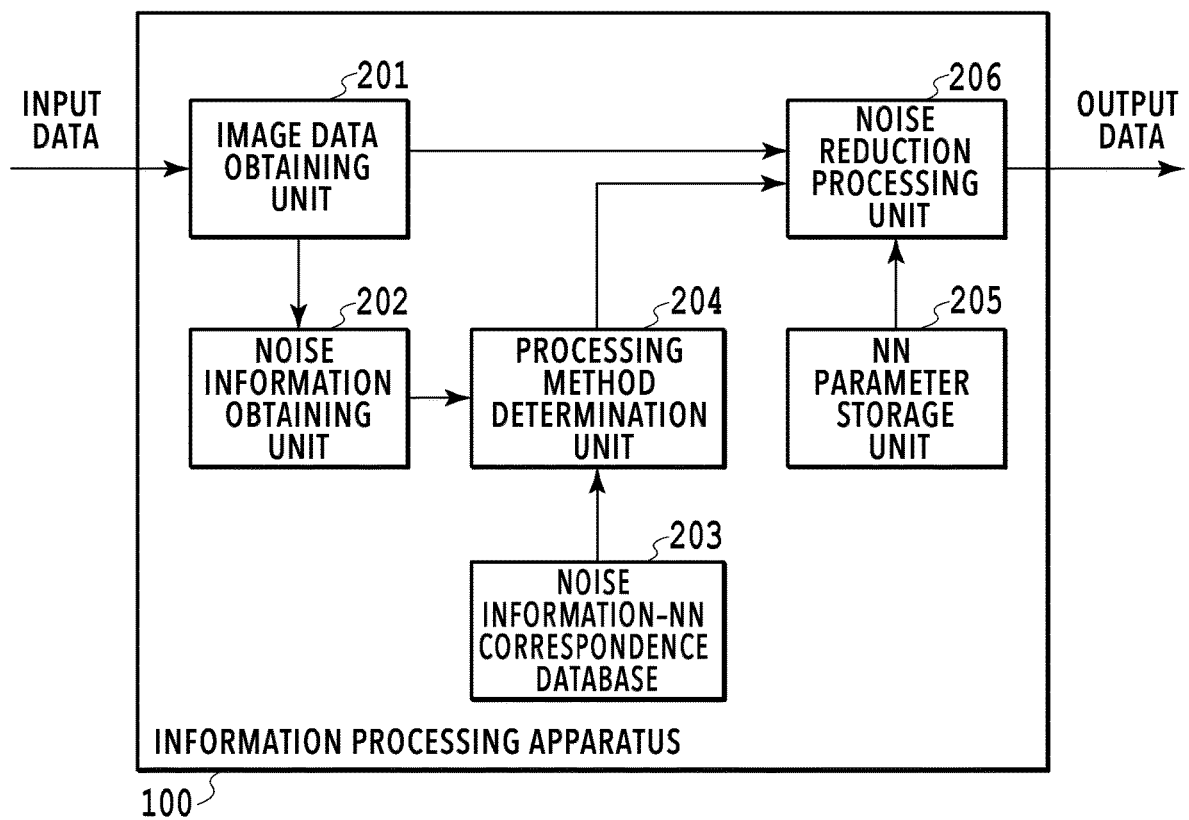
FIG. 2 is a functional block diagram of the information processing apparatus in the first embodiment.

FIG. 2 is the functional block diagram of the information processing apparatus according to the present embodiment. The information processing apparatus 100 according to the present embodiment has functions as an image data obtaining unit 201, a noise information obtaining unit 202, a noise information—NN correspondence database 203, a processing method determination unit 204, a NN parameter storage unit 205, and a noise reduction processing unit 206. The details of the individual functional units will be described later with reference to the flowchart in FIG. 3.

Next, noise reduction processing according to the present embodiment and a NN to be used in the noise reduction processing will be described.

Conventionally, noise reduction processing with a NN has been established on the premise of one-time processing. That is, the NN is subjected to learning so that all noise is removed through one-time processing for an image captured at a particular ISO sensitivity.

Meanwhile, the present embodiment uses a characteristic that noise reduction processing with a NN can be divided into multiple parts. For images with various noise levels, it has conventionally been necessary to preliminarily subject, to learning, a large number of NNs for these noise levels. However, in the present embodiment, the use of the above-described characteristic enables effective noise reduction for high image quality by using a smaller number of NNs, thus enabling reduction in cost needed for subjecting the NNs to learning and retaining the NNs.

Next, division of the noise reduction processing in the present embodiment will be described. In general, it is known that variance of noise included in an image has additivity. More specifically, n-times addition of noise of variance value V (a random number) gives resulting noise variance value nV. It is found from this characteristic that in order to remove noise of the variance value nV, multiple pieces of noise reduction processing may be combined so that the total of the noise to be removed is nV. For example, processing for removing noise of the variance value V may be repeated n times or processing for removing noise of variance value nV/2 may be repeated twice.

It is also known that a variance value of noise included in an image is proportional to an ISO sensitivity. Thus, for example, it is possible to make a setting so that noise reduction processing to be performed on an image captured at an ISO sensitivity of 12800 is replaced with two repetitions of noise reduction processing with a NN subjected to learning for an ISO sensitivity of 6400. Additionally, a similar effect can be obtained by making a setting so that noise reduction processing with a NN subjected to learning for an ISO sensitivity of 3200 is repeated four times.

In view of the above characteristics, the processing method determination unit 204 determines a noise reduction processing method (that is, a NN to be used and the number of executions of processing) based on the ISO sensitivity of a processing target image and NNs retained by the NN parameter storage unit 205. The noise information—NN correspondence database 203 retains, as combination data, information showing a combination of the ISO sensitivity of the processing target image and noise reduction processing associated with the ISO sensitivity. The processing method determination unit 204 determines a noise reduction processing method based on the combination data. The combination data is information in which the ISO sensitivity, a parameter for a noise level, is associated with a NN to be applied in the NNs retained by the NN parameter storage unit 205 and the number of executions of processing.

For example, in a case where an image captured at an ISO sensitivity of 12800 is input and only a NN subjected to learning for an ISO sensitivity of 3200 is a NN retained by the NN parameter storage unit 205, it is determined that a method of repeating noise reduction processing using the NN four times is used. In this case, combination data retained by the noise information—NN correspondence database 203 represents information showing that the NN subjected to learning for an ISO sensitivity of 3200 is to be applied four times in a case where the ISO sensitivity of the input image is 12800.

Additionally, the combination data may be information showing order of applications of multiple NNs. For example, in a case where the ISO sensitivity of an input image is 12800 and NN (A) subjected to learning for an ISO sensitivity of 9600 is combined with NN (B) subjected to learning for an ISO sensitivity of 3200, processing order may be the first NN (A) and the second NN (B). The order can be determined according to image quality required by a user. For example, assuming that processing in the order of the first NN (B) and the second NN (A) provides a better resolution feel instead of increasing artifacts than that in the order of the first NN (A) and the second NN (B), the order of the first NN (B) and the second NN (A) may be selected in a case where the user prioritizes the resolution feel.

Regarding a method in which the user gives instructions of required image quality, the user makes a selection from multiple options for desired image quality via the operation unit 110 for the information processing apparatus 100 (specifically, a GUI on a PC, for example). As the multiple options, low-artifact priority, resolution-feel priority, and the like can be mentioned. In this case, the noise information—NN correspondence database 203 retains multiple pieces of combination data for the ISO sensitivity of one input image, and each of the multiple pieces of combination data is associated with the required image quality.

Subsequently, the processing method determination unit 204 uniquely determines a noise reduction processing method based on the required image quality and the ISO sensitivity of the input image. In the above-described example, the order of the first NN (A) and the second NN (B) is associated with the low-artifact priority, and the order of the first NN (B) and the second NN (A) is associated with the resolution-feel priority.

Next, the structure of a NN will be described with reference to FIG. 4A to 4C. FIG. 4A shows an example of the overall structure of the NN. In the present embodiment, a convolutional neural network (CNN: Convolutional NN) is used as an example to give a description, but the structure in the invention is not limited to this structure.

In the structure shown in FIG. 4A, first, an image including noise is input in an input layer. Subsequently, processing in block 1 to processing in block N are sequentially executed. Lastly, data is output to an output layer. Data transferred between the blocks has a size identical to that of the input data or is in the form of a multichannel image with a lower resolution. The output data is estimated noise or an image with reduced noise. In a case where the output data is estimated noise, an image with reduced noise is obtained by subtracting the output data from the input data.

FIG. 4B shows the structure of each of block 1 to block N. Although each block has a structure in which a convolutional layer, a normalization layer, and an activation layer are connected, the block does not necessarily need to include all the layers and the structure may differ depending on the block. Additionally, the overall structure of the NN may have a skip connection through which output from the input layer or any block is added or linked to output from another block. FIG. 4C shows, as an example of the structure of the NN from which an image with reduced noise is output, a structure having a skip connection through which output from the input layer and output from the blocks are added.

The convolutional layer adds, to each channel of input data, a result of a convolution with a predetermined filter and produces output. A filter coefficient is determined by learning to be described later. The number of output channels of the convolutional layer can be set to any number, and filters of kinds depending on the number of the output channels may be prepared.

The normalization layer performs linear transformation for correcting the mean and variance of the input data. For example, a linear-transformation coefficient is determined by learning to be described later so that output from the normalization layer in a case where data for learning is input has a mean value of 0 and a variance value of 1.

The activation layer performs nonlinear transformation independently for each element with respect to the input data. For the nonlinear transformation, it is possible to use a generally known function, specifically, a sigmoid function, a tanh function, a rectified linear unit (ReL U), or the like.

Next, learning for the NN will be described. The learning for the NN specifically refers to determination of parameters constituting the NN by using data for the learning. As the parameters, for example, a filter coefficient of the convolutional layer and a linear-transformation coefficient of the normalization layer can be mentioned.

The data for the learning is a pair set of input data (student data) and an answer value of output data (teacher data). For the purpose of noise reduction, the student data is an actually captured image or a noise image obtained by adding artificial noise to a CG image, and the teacher data is an original image before addition of noise or added noise per se.

The artificial noise is typically generated by adding a Gaussian random number with an identical variance value independently for each pixel but may be generated by using a more realistic noise model such as brightness-dependent noise. The variance value of the artificial noise is a value corresponding to a particular ISO sensitivity.

Additionally, it is possible to use, as data for learning, a pair set of images of an identical object captured under different ISO sensitivity conditions without using the artificial noise. This method enables learning using real noise and therefore has a merit of achieving a high noise reduction effect on an actually captured image as compared with a case where the artificial noise is used for learning. However, on the other hand, slight displacement corresponding to one or more pixels between image pairs is not allowed, thus making it difficult to capture images and constraining image capturing scenes.

In general, the CNN undergoes learning in the unit of a patch (a small region extracted from an image). In processing after the learning, input is given without changing the size of the entire image, so that an output image of an identical size can be obtained.

Figure 3:
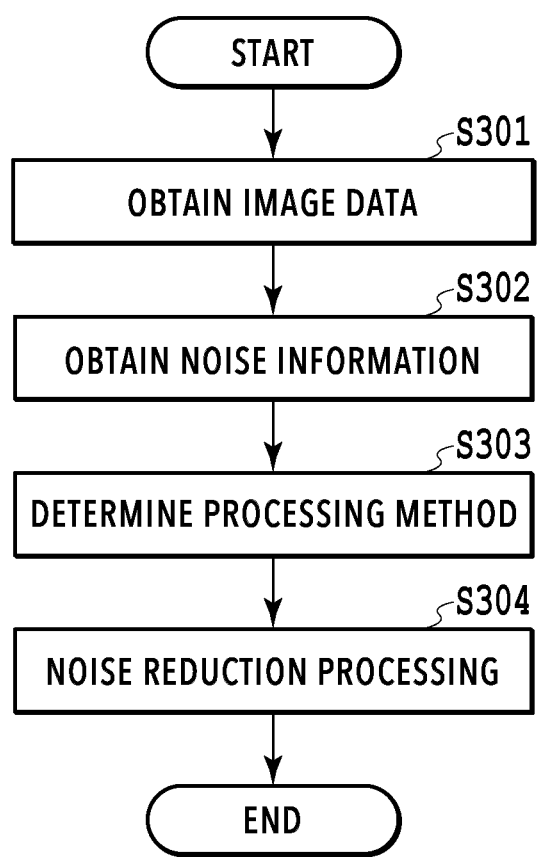
FIG. 3 is a flowchart of noise reduction processing in the first embodiment.

FIG. 3 shows a flowchart of noise reduction processing according to the present embodiment. Hereinafter, a flow of the noise reduction processing in the present embodiment will be described with reference to the flowchart in FIG. 3. A series of kinds of processing shown in the flowchart is achieved by the CPU 101 reading out, into the RAM 102, program code stored in a storage area such as the ROM 103 to execute the program code. Alternatively, it is also possible to achieve some or all functions in steps shown in the flowchart by using hardware such as an ASIC or electronic circuit. Additionally, the following symbol "S" means a "step" in the flowchart. The same applies to the other flowcharts.

In S301, the image data obtaining unit 201 obtains image data that is a processing target. The image data may be in any form such as RAW or JPEG.

In S302, the noise information obtaining unit 202 obtains, from the image data obtained in S301, an ISO sensitivity in capturing an image as information on a noise level (hereinafter, also referred to as noise information). The ISO sensitivity in capturing an image can be obtained from information such as an exchangeable image file format (EXIF) attached to the image data.

In S303, the processing method determination unit 204 determines a method for noise reduction processing using a NN based on the ISO sensitivity obtained in S302. More specifically, the unit determines a method for noise reduction processing suited to the ISO sensitivity of an input image with reference to a lookup table retained by the noise information—NN correspondence database 203. Additionally, it is possible to determine a method for noise reduction processing according to the ISO sensitivity and the image quality required by the user.

FIG. 5A shows an example of a lookup table in the present embodiment. A lookup table 501 shows an example of a case where noise reduction processing is performed on input images having ISO 1600 to 12800 by using a NN subjected to learning for an ISO sensitivity of 1600 and a NN subjected to learning for an ISO sensitivity of 3200. More specifically, for input images having respective ISO sensitivities of ISO 1600, 3200, 6400, and 12800, the lookup table 501 retains a combination of the numbers of applications of a NN for ISO 1600 or 3200. Additionally, the lookup table 501 retains a combination of NNs for each of a case where image quality is prioritized and a case where processing speed is prioritized.

In this example, in a case where an input image has an ISO sensitivity of 1600, a method in which a NN subjected to learning for an ISO sensitivity of 1600 is applied once is selected both in prioritizing image quality and in prioritizing speed. In a case where an input image has an ISO sensitivity of 3200, a method in which a NN subjected to learning for an ISO sensitivity of 3200 is applied once is selected both in prioritizing image quality and in prioritizing speed. In a case where an input image has an ISO sensitivity exceeding ISO 3200, a NN subjected to learning for an ISO sensitivity of 1600 or a NN subjected to learning for an ISO sensitivity of 3200 is applied multiple times depending on which of image quality and speed is prioritized, as shown in the figure.

A NN whose corresponding ISO sensitivity is lower is less likely to cause image quality deterioration. Thus, in prioritizing image quality, the multiple-times application of a NN whose corresponding ISO sensitivity is lower is preferable. Meanwhile, in prioritizing speed, the fewer-times application of a NN whose corresponding ISO sensitivity is higher is preferable.

Additionally, each time processing is performed, the processing method determination unit 204 may derive, without using a lookup table, a combination of NNs such that the ISO sensitivity of the input image roughly matches the total value of an ISO sensitivity associated with a NN to be applied. As constraint conditions in determining a combination of NNs and order of applications of the NNs, instructions of required image quality from the user may be added, as described earlier.

In S304, the noise reduction processing unit 206 executes noise reduction processing using a NN in accordance with the method for noise reduction processing determined in S303. More specifically, the unit reads out a NN parameter selected in S303 from the NN parameter storage unit 205 and sequentially executes the noise reduction processing using a NN in accordance with the combination or order of NNs. As a result, an output image with the reduced noise of the input image is obtained.

As described above, in the present embodiment, it is possible to determine a NN to be applied and the number of applications based on an ISO sensitivity in capturing an image and then perform noise reduction. The present embodiment enables reduction in the number of NNs to be used and noise reduction for high image quality with respect to images with various noise levels.

Second Embodiment

In the first embodiment, a description has been given of a case where the ISO sensitivity of an input image is obtained and then a method for noise reduction processing is determined. However, even at an identical ISO sensitivity, the amount of noise may differ depending on a camera model, and therefore, it may be impossible to obtain any expected noise reduction effect by using the above-described method. Thus, in the present embodiment, a description will be given of a case where an input image is analyzed, a NN to be applied and the number of applications are determined based on an estimated noise level, and noise reduction is performed.

The hardware configuration of an information processing apparatus in the present embodiment is the same as the first embodiment. Hereinafter, regarding processing performed in the information processing apparatus 100 according to the present embodiment, a description will be given mainly of differences from the first embodiment by using the functional block diagram in FIG. 2 and the flowchart in FIG. 3, to which reference has been made in the description of the first embodiment. More specifically, processing in each of S302 and S303 in FIG. 3 will be described.

In S302, the noise information obtaining unit 202 analyzes the image data obtained in S301 and estimates the noise level to obtain the noise level as noise information. As a method for this operation, it is possible to use a method disclosed, for example, in Foi. A., M. Trimeche, V. Katkovnik, and K. Egiazarian, "Practical Poissonian-Gaussian noise modeling and fitting for single-image raw-data," IEEE Trans. Image process, Vol. 17, No. 10, pp. 1737-1754, 2008. Noise included in an image is generated mainly in the inside of an image capturing element. As a model generally used, noise of an individual pixel value is given independently among pixels as a random number that follows normal distribution having a standard deviation determined based on brightness. Such noise will hereinafter be referred to as brightness-dependent noise. The standard deviation of the brightness-dependent noise is generally given by Expression (1) below:

$$\sigma(x) = \sqrt{a \cdot \max[x, 0] + b} \qquad \text{Mathematical Expression 1}$$

Here, x is a pixel value before noise is added, a and b are each a model parameter differing depending on an ISO sensitivity and a camera model, and max is a function that returns a larger value of arguments.

The above-described noise level specifically refers to the standard deviation. Artificial noise to be added in learning for a NN can be given independently among individual pixels as a normal random number having the standard deviation given by Expression (1). The standard deviation is a value different for each pixel, and a and b are each a common value regardless of pixels.

Additionally, the standard deviation is not necessarily limited to the above-described model and may be a common value among pixels. Alternatively, modeling other than the above may be performed. For example, in a case where noise not depending on brightness is assumed, the standard deviation may be assumed to be a constant value among all the pixels or it may be assumed that the standard deviation differs for each partial region of an image. In the latter case, subsequent processing needs to be performed individually for each partial region of the image, as will be described later in a fourth embodiment.

In S303, the processing method determination unit 204 determines a method for noise reduction processing using a NN based on the noise level obtained in S302. More specifically, the unit determines a NN for performing noise reduction processing suited to an estimated noise level and the number of applications of the NN with reference to a lookup table retained by the noise information—NN correspondence database 203.

In this embodiment, a description will be given of a method for determining noise reduction processing in the present embodiment by using, as an example, a case where the above-described brightness-dependent noise model is used. For example, the NN parameter storage unit 205 retains the following two NNs: a NN (A) subjected to learning after setting the value a as c (c is any constant) and generating artificial noise and a NN (B) subjected to learning after setting the value a as 2c and generating artificial noise. In a case where the value a is estimated to be a value close to 3c as a result of performing, on an input image, noise level analysis in S302, the following method is determined: a combination of processing for the NN (A) and processing for the NN (B) to be individually performed once or the processing for the NN (A) to be performed three times. As described above, for a parameter proportional to a variance value of noise, the processing method determination unit 204 determines a combination of NNs such that an estimated value of the input image roughly matches the sum of values used in learning for individual NNs. A method for determining the combination can be performed by using the lookup table retained by the noise information—NN correspondence database 203 as in the first embodiment.

FIG. 5B shows an example of the lookup table in the present embodiment. In a lookup table 502, a NN to be applied to each of a case where image quality is prioritized and a case where speed is prioritized and the number of applications are registered according to the value of model parameter a. In a case where the value of a is estimated to be a value close to c, a NN for a=c is applied once both in prioritizing image quality and in prioritizing speed. In a case where the value of a is estimated to be a value close to 2c, a NN for a=2c is applied once both in prioritizing image quality and in prioritizing speed. In a case where the value of a is estimated to be a value close to 3c or a value close to 4c, a NN for a=c or a combination of a NN for a=c and a NN for a=2c is individually applied at the number of applications shown in the figure.

Additionally, in a case where noise not depending on brightness is assumed, reference is made to the lookup table based on estimated standard deviation to determine a combination of NNs. As a method for estimating the standard deviation in this case, an existing method publicly known to one skilled in the art can be used.

As described above, in the present embodiment, it is possible to determine a NN to be applied and the number of applications based on a noise level estimated by analyzing an input image and then perform noise reduction. The present embodiment enables reduction in the number of NNs to be used and noise reduction for high image quality with respect to images with various noise levels.

Third Embodiment

In the present embodiment, a description will be given of a case where a NN to be applied and the number of applications are determined based on a gain value for sensitivity correction in place of an ISO sensitivity and then noise reduction is performed. The gain value specifically corresponds to a set ISO sensitivity and refers to an analog gain to be added to output of an image capturing element.

The hardware configuration of an information processing apparatus in the present embodiment is the same as the first embodiment. Hereinafter, regarding processing performed in the information processing apparatus 100 according to the present embodiment, a description will be given mainly of differences from the first embodiment by using the functional block diagram in FIG. 2 and the flowchart in FIG. 3, to which reference has been made in the description of the first embodiment. More specifically, processing in each of S302 and S303 in FIG. 3 will be described.

In S302, the noise information obtaining unit 202 obtains, as noise information, a gain value that is for sensitivity correction and corresponds to the image data obtained in S301. The gain value may be provided in a mode in which the gain value is attached, as metadata, to the image data or in which a table describing a correspondence relationship between the image data and the gain value is prepared separately and then the gain value is obtained with reference to the table.

In S303, the processing method determination unit 204 determines a method for noise reduction processing using a NN based on the gain value obtained in S302. More specifically, the unit determines a NN for performing noise reduction processing suited to the gain value used in processing for the target image and the number of applications of the NN with reference to a lookup table retained by the noise information—NN correspondence database 203.

As described above, in the present embodiment, it is possible to determine a NN to be applied and the number of applications based on a gain value for sensitivity correction in place of an ISO sensitivity and then perform noise reduction. The present embodiment enables reduction in the number of NNs to be used and noise reduction for high image quality with respect to images with various noise levels.

Fourth Embodiment

In the first to third embodiments, descriptions have been given of a case where noise reduction processing is performed uniformly on an entire still image. However, in a case where noise characteristics differ for each region in the image, it is preferable to perform region segmentation on the image, perform suitable noise reduction processing individually for each partial region, and integrate partial images after processing. Additionally, in a case where noise characteristics differ between frames in a moving image, it is preferable to perform suitable noise reduction processing individually for each frame. Thus, in the present embodiment, a description will be given of a case where noise reduction is performed independently for each partial region of a still image or each frame of a moving image.

The hardware configuration of an information processing apparatus in the present embodiment is the same as the first embodiment. Hereinafter, processing performed in the information processing apparatus 100 according to the present embodiment will be described by using a functional block diagram shown in FIG. 6 and a flowchart shown in FIG. 7.

Figure 6:
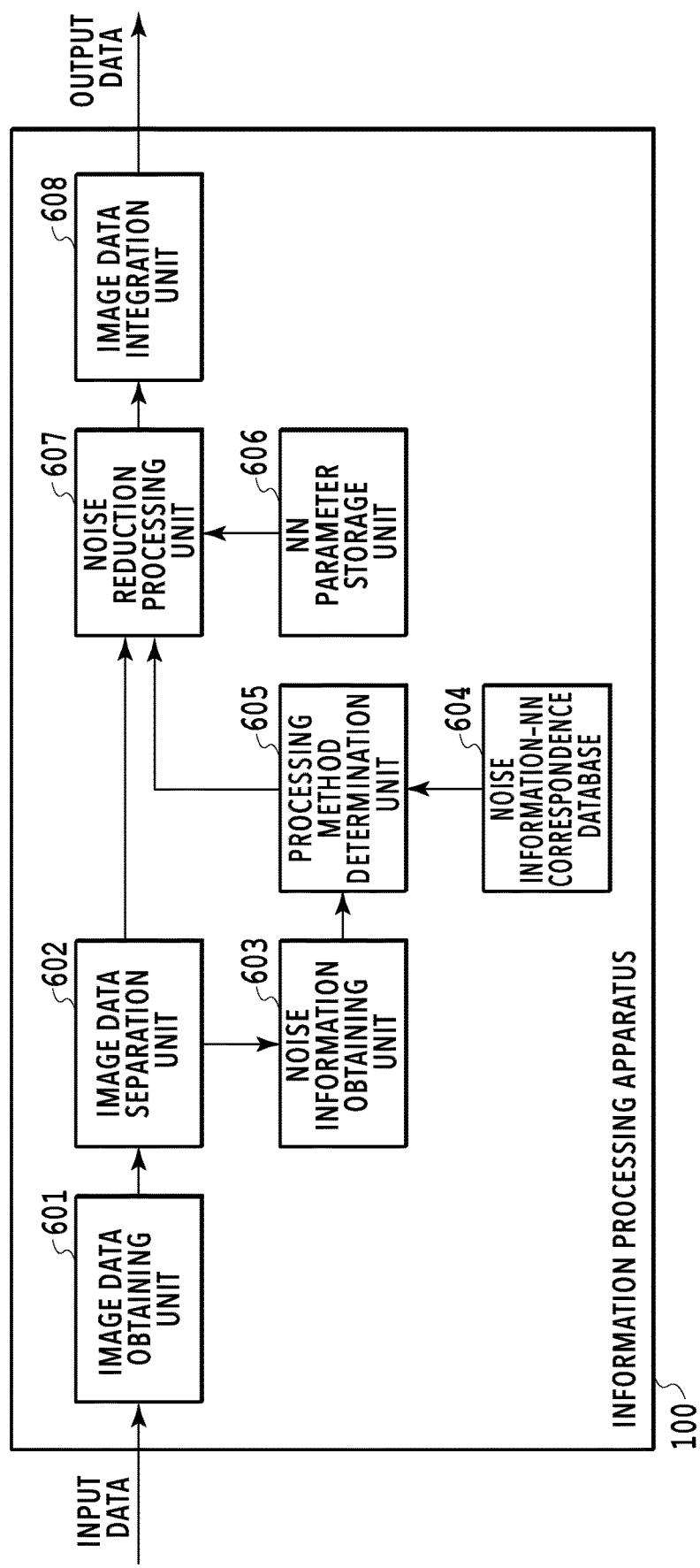
FIG. 6 is a functional block diagram of an information processing apparatus in a fourth embodiment.

FIG. 6 is the functional block diagram of the information processing apparatus according to the present embodiment. The information processing apparatus 100 according to the present embodiment has functions as an image data obtaining unit 601, an image data separation unit 602, a noise information obtaining unit 603, and a noise information—NN correspondence database 604. The apparatus also has functions as a processing method determination unit 605, a NN parameter storage unit 606, a noise reduction processing unit 607, and an image data integration unit 608. The details of the individual functional units will be described later with reference to the flowchart in FIG. 7.

Figure 7:
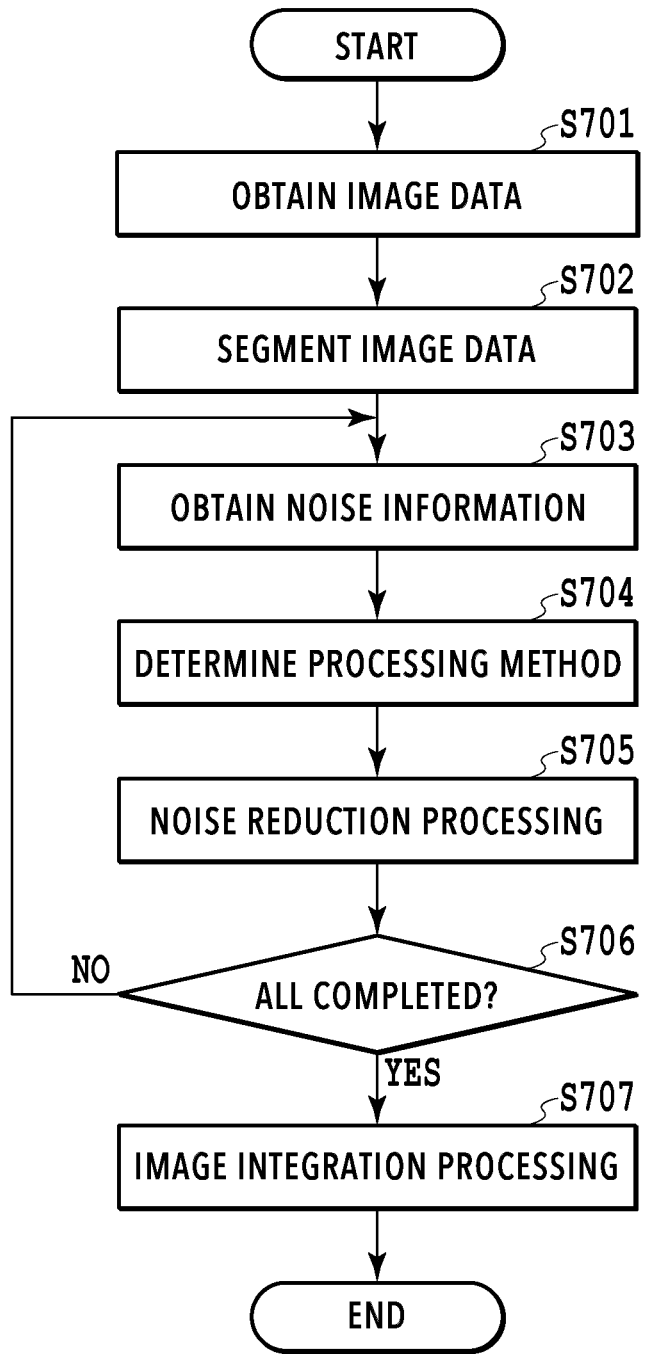
FIG. 7 is a flowchart of noise reduction processing in the fourth embodiment.

FIG. 7 shows the flowchart of noise reduction processing in the present embodiment. Hereinafter, a flow of the noise reduction processing in the present embodiment will be described with reference to the flowchart in FIG. 7.

In S701, the image data obtaining unit 601 obtains image data that is a processing target. In the present embodiment, the image data may be a still image or moving image. Additionally, the form of the image data may be any form.

In S702, the image data separation unit 602 segments the image data obtained in S701 into partial images. Each of the partial images may be part of a still image or one frame of a moving image.

In S703, the noise information obtaining unit 603 analyzes each partial image obtained by segmentation in S702 to estimate the standard deviation or model parameters of noise as in the second embodiment. The noise information obtaining unit 603 obtains, as noise information, the estimated standard deviation or model parameters of the noise. Alternatively, an ISO sensitivity may be obtained as in the first embodiment or a gain value for sensitivity correction may be obtained as in the third embodiment.

In S704, the processing method determination unit 605 determines a method for noise reduction processing for each partial image based on the noise information obtained in S703. More specifically, as described in the first to third embodiments, the unit determines a NN associated with the noise information and the number of applications of the NN with reference to a lookup table retained by the noise information—NN correspondence database 604.

In S705, the noise reduction processing unit 607 executes noise reduction processing using a NN in accordance with the method for noise reduction processing determined in S704. More specifically, the unit reads out a NN parameter selected in S704 from the NN parameter storage unit 606 and sequentially executes the noise reduction processing using a NN in accordance with the combination or order of NNs.

In S706, the information processing apparatus 100 determines whether the processing in each of S703 to S705 has been completed for all the partial images. In a case where the processing has not been completed, the apparatus returns to S703, selects unprocessed partial images, and executes the processing in each of S703 to S705. In a case where the processing has been completed, the apparatus advances to S707.

In S707, the image data integration unit 608 integrates all the processed partial images and reconstructs the still image or moving image. As a result, an output image with the reduced noise of the input image is obtained.

As described above, in the present embodiment, noise reduction can be performed independently for each partial region of the still image or each frame of the moving image. The present embodiment enables reduction in the number of NNs to be used and noise reduction for high image quality with respect to images with various noise levels.

Fifth Embodiment

In the present embodiment, a description will be given of a method for converting an image into a different color space to separate the image into a brightness component and color components and then performing noise reduction processing on each component.

The hardware configuration of an information processing apparatus in the present embodiment is the same as the first embodiment. Hereinafter, processing performed in the information processing apparatus 100 according to the present embodiment will be described by using the functional block diagram shown in FIG. 6, to which reference has been made in the description of the fourth embodiment, and a flowchart shown in FIG. 8.

The functional configuration of the information processing apparatus 100 according to the present embodiment is the same as the fourth embodiment but is different in that image data is separated into a brightness component and color components and then noise reduction processing is performed on each component.

Figure 8:
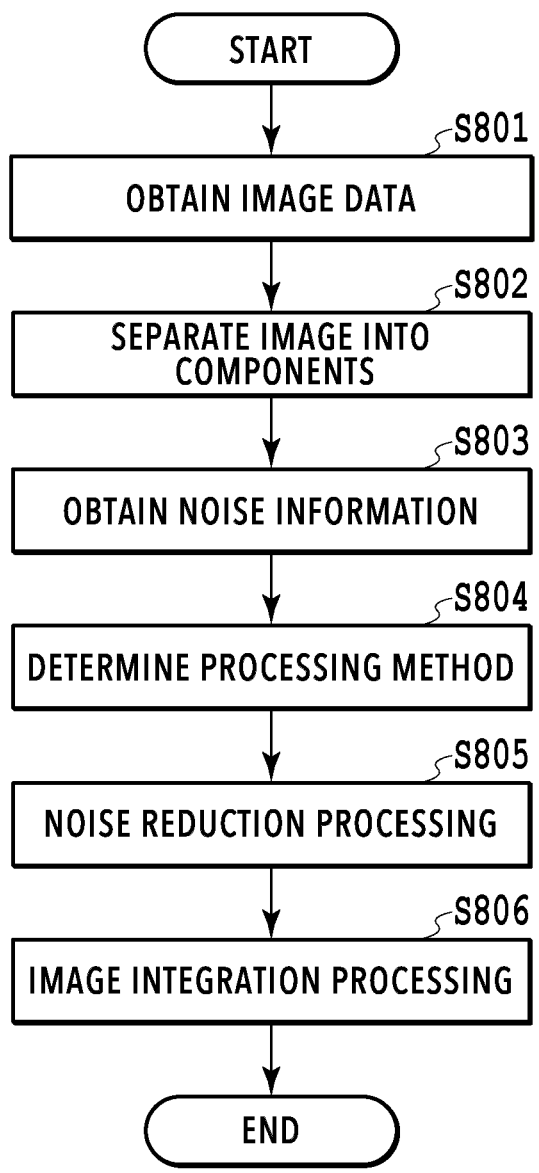
FIG. 8 is a flowchart of noise reduction processing in a fifth embodiment.

FIG. 8 shows the flowchart of noise reduction processing according to the present embodiment. Hereinafter, a flow of the noise reduction processing in the present embodiment will be described with reference to the flowchart in FIG. 8.

In S801, the image data obtaining unit 601 obtains image data that is a processing target.

In S802, the image data separation unit 602 separates the image data obtained in S801 into a brightness component and color components. As color spaces, general color spaces such as Y CrCb and Lab can be used.

In S803, the noise information obtaining unit 603 analyzes all or any one of the brightness component and the color components obtained by the separation in S802 to estimate the standard deviation or model parameters of noise. The noise information obtaining unit 603 obtains, as noise information, the estimated standard deviation or model parameters of the noise.

In S804, the processing method determination unit 605 determines a method for noise reduction processing for each component based on the noise information obtained in S803. More specifically, as described in the first to third embodiments, the unit determines a NN associated with the noise information and the number of applications of the NN with reference to a lookup table retained by the noise information—NN correspondence database 604.

In S805, the noise reduction processing unit 607 executes noise reduction processing using a NN on the image of each component in accordance with the method for noise reduction processing determined in S804. More specifically, the unit reads out a NN parameter selected in S804 from the NN parameter storage unit 606 and sequentially executes the noise reduction processing using a NN in accordance with the combination or order of NNs.

In S806, the image data integration unit 608 integrates the images of the individual processed components and converts the integrated images into the original color space to achieve image reconstruction. As a result, an output image with the reduced noise of the input image is obtained.

As described above, in the present embodiment, an image is converted into a different color space to be separated into a brightness component and color components, and then noise reduction processing is performed on each component. The present embodiment enables reduction in the number of NNs to be used and noise reduction for high image quality with respect to images with various noise levels.

Sixth Embodiment

In the present embodiment, a description will be given of a method for repeating noise reduction processing using a single NN to obtain a noise reduction effect with a desired level.

The hardware configuration of an information processing apparatus in the present embodiment is the same as the first embodiment. Hereinafter, processing performed in the information processing apparatus 100 according to the present embodiment will be described by using a functional block diagram shown in FIG. 9 and a flowchart shown in FIG. 10.

Figure 9:
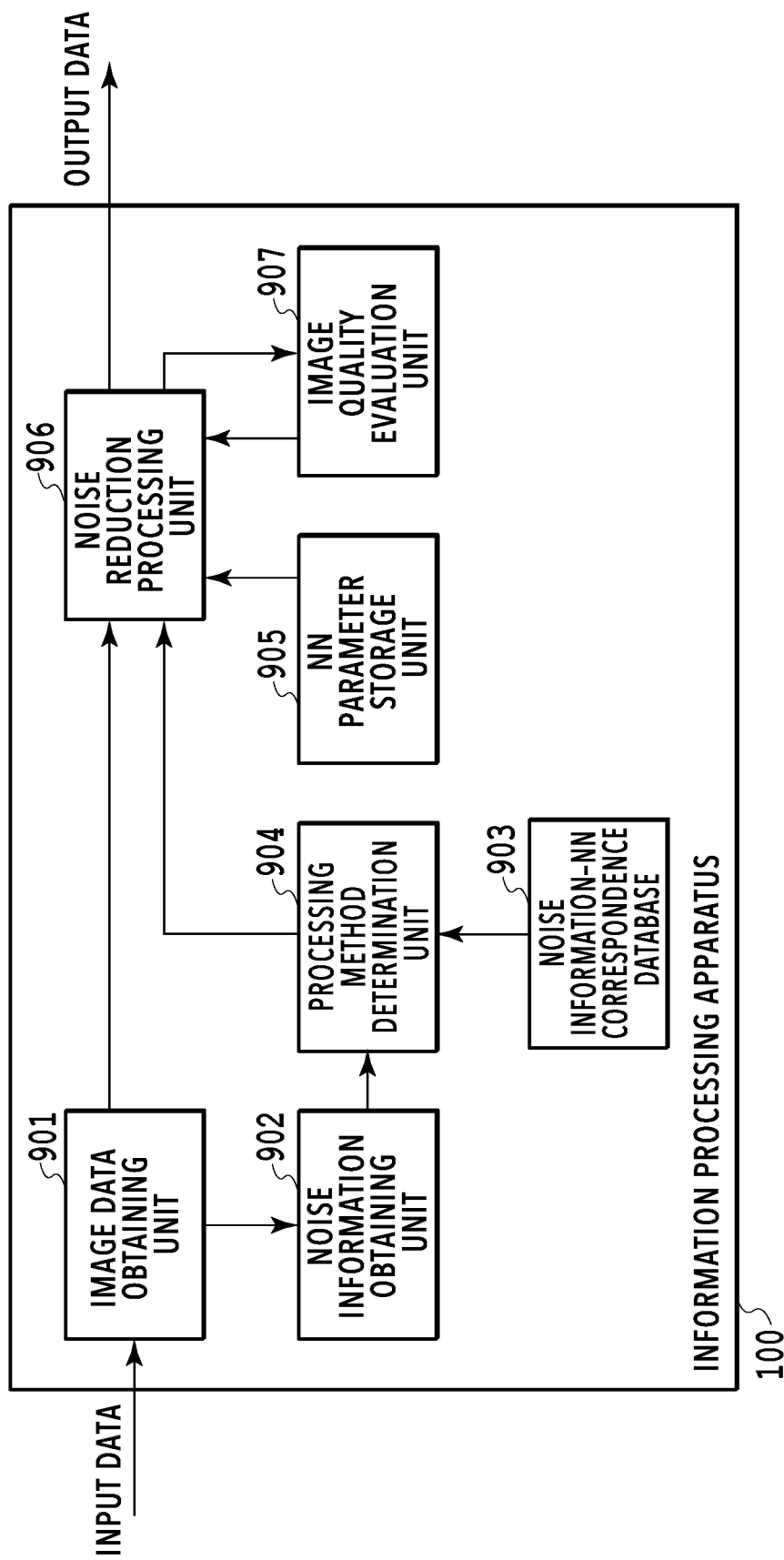
FIG. 9 is a functional block diagram of an information processing apparatus in a sixth embodiment.

FIG. 9 is the functional block diagram of the information processing apparatus according to the present embodiment. The information processing apparatus 100 according to the present embodiment has functions as an image data obtaining unit 901, a noise information obtaining unit 902, a noise information—NN correspondence database 903, a processing method determination unit 904, a NN parameter storage unit 905, a noise reduction processing unit 906, and an image quality evaluation unit 907. The details of the individual functional units will be described later with reference to the flowchart in FIG. 10.

Figure 10:
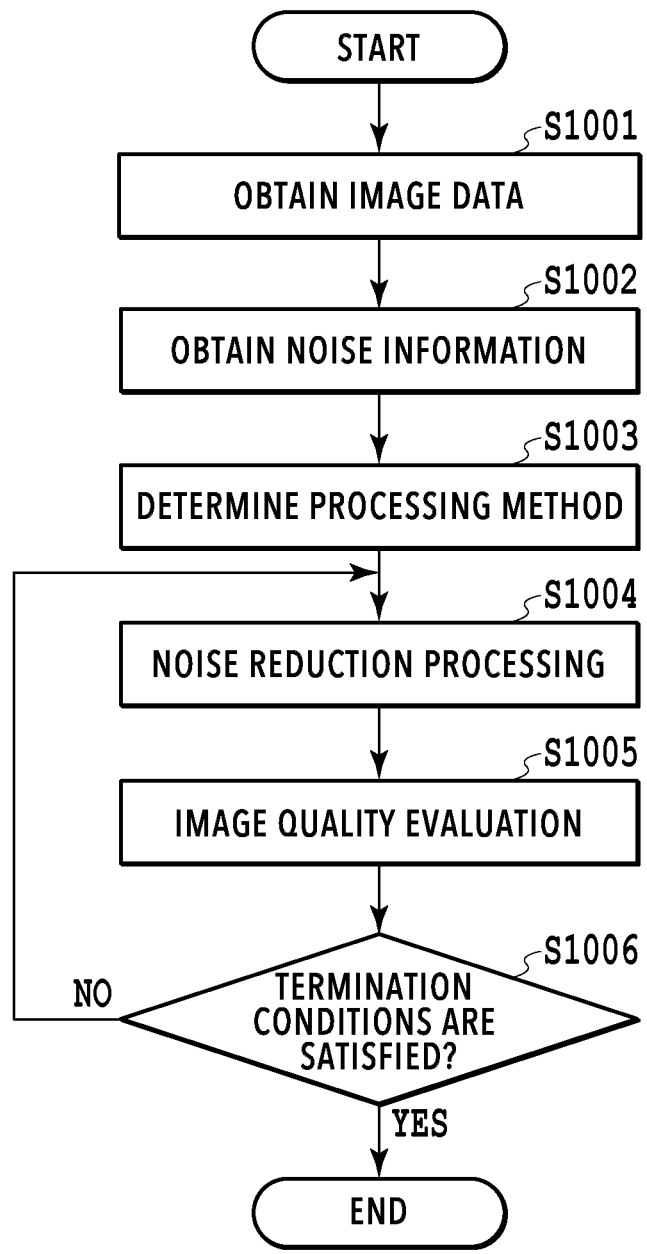
FIG. 10 is a flowchart of noise reduction processing in the sixth embodiment.

FIG. 10 shows the flowchart of noise reduction processing in the present embodiment. Hereinafter, a flow of the noise reduction processing in the present embodiment will be described with reference to the flowchart in FIG. 10.

In S1001, the image data obtaining unit 901 obtains image data that is a processing target.

In S1002, the noise information obtaining unit 902 analyzes the image data obtained in S1001 and estimates the standard deviation or model parameters of noise to obtain, as noise information, the standard deviation or model parameters as in the second embodiment. Alternatively, as noise information, an ISO sensitivity may be obtained as in the first embodiment and a gain value for sensitivity correction may be obtained as in the third embodiment.

In S1003, the processing method determination unit 904 determines a noise reduction processing method using a NN based on the noise information obtained in S1002. More specifically, the unit determines a NN to be used in noise reduction processing with reference to a lookup table retained by the noise information—NN correspondence database 903. In the present embodiment, it is desired that a single NN to be used in noise reduction processing can be specified, and it is not necessarily desired that the number of applications be determined.

In S1004, the noise reduction processing unit 906 executes noise reduction processing by using the NN determined in S1003. More specifically, the unit reads out a NN parameter determined in S1003 from the NN parameter storage unit 905 and executes the noise reduction processing using the NN. Subsequently, the unit outputs image data on which the noise reduction processing has been executed.

In S1005, the image quality evaluation unit 907 performs image quality evaluation of the output image data on which the noise reduction processing has been executed in S1004.

The image quality evaluation unit 907, for example, may analyze the output image data like the noise information obtaining unit 902 to estimate the residual noise level of the output image data. Alternatively, the output image data may be displayed on the display device 109 so that the user determines the residual noise of the output image data.

In S1006, the information processing apparatus 100 determines whether or not a result of the image quality evaluation in S1005 satisfies termination conditions. In a case where the result does not satisfy the termination conditions, the apparatus returns to S1004 to recursively execute noise reduction processing. On the other hand, in a case where the result satisfies the termination conditions, the processing is terminated. More specifically, in a case where the image quality evaluation unit 907 estimates a residual noise level, the processing is terminated in a case where the standard deviation or model parameters of noise are below predetermined thresholds. On the other hand, in a case where the standard deviation or model parameters of the noise are more than or equal to the predetermined thresholds, the apparatus returns to S1004 to additionally execute noise reduction processing. Further, in a case where the user makes a determination, the apparatus returns to S1004 to additionally execute noise reduction processing according to instructions for additional processing inputted by the user via the operation unit 110.

As described above, the present embodiment enables obtainment of a noise reduction effect with a desired level by repeating noise reduction processing using a single NN. The present embodiment enables reduction in the number of NNs to be used by performing adaptive noise reduction processing using a single NN and also enables noise reduction for high image quality with respect to input images with various noise levels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)ù), a flash memory device, a memory card, and the like.

The present invention enables reduction in the number of neural networks to be used and noise reduction for high image quality with respect to images with various noise levels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097496, filed May 24, 2019, which is hereby incorporated by reference wherein in its entirety.

What is claimed is:

1. An image processing apparatus that executes noise reduction processing for an image by using multiple neural networks subjected to learning of results obtained by executing the noise reduction processing on images each having a predetermined noise level, the apparatus comprising:
   a retaining unit configured to retain combination data showing a combination of multiple pieces of the noise reduction processing for each of multiple noise levels, the combination data associating a parameter for the multiple noise levels with at least either a combination of neural networks to be applied in the multiple neural networks or a number of applications of the neural networks;
   an obtaining unit configured to obtain information on the noise levels from a processing target image;
   a determination unit configured to determine, based on the obtained information on the noise levels, a combination of pieces of the noise reduction processing for the processing target image from the combination data retained by the retaining unit; and
   an execution unit configured to execute, based on data on the combination of pieces of the noise reduction processing determined by the determination unit, the noise reduction processing using at least one of the multiple neural networks for the processing target image,
   wherein combinations of multiple pieces of the noise reduction processing include a pluralities of combinations differing among a pluralities of cases where image quality is prioritized and a pluralities of cases where speed is prioritized.

2. The image processing apparatus according to claim 1, wherein
   the parameter for the multiple noise levels is information on an ISO sensitivity in capturing the image, a gain value for sensitivity correction, or a variance value of noise.

3. The image processing apparatus according to claim 1, wherein
   the number of applications of the neural networks is set so that the neural networks are applied multiple times to an image having the predetermined noise level.

4. The image processing apparatus according to claim 1, wherein the processing target image is a partial image obtained by segmenting an input image, the apparatus further comprising:
   a segmentation unit configured to segment the input image into partial images; and
   an integration unit configured to integrate the partial images on which the noise reduction processing has been executed.

5. The image processing apparatus according to claim 4, wherein
   the input image is a still image, and
   each of the partial images is part of the still image.

6. The image processing apparatus according to claim 4, wherein
   the input image is a moving image, and
   each of the partial images is one frame of the moving image.

7. The image processing apparatus according to claim 1, wherein the processing target image is an image of a brightness component or each of color components obtained by separating an input image, the apparatus further comprising:
   a separation unit configured to separate the input image into the image of the brightness component and the image of each of the color components; and
   an integration unit configured to integrate the image of the brightness component and the image of each of the color components on which the noise reduction processing has been executed.

8. The image processing apparatus according to claim 1, further comprising:
   a display unit configured to display the image on which the noise reduction processing has been executed; and
   an input unit configured to input user's instructions for additional processing,
   wherein the execution unit additionally executes the noise reduction processing according to the user's instructions.

9. The image processing apparatus according to claim 1, wherein the determination unit is further configured to determine whether or not a residual noise level of the image on which the noise reduction processing has been executed satisfies predetermined conditions,
   wherein in a case where it is determined that the residual noise level does not satisfy the predetermined conditions, the execution unit additionally executes the noise reduction processing.

10. The image processing apparatus according to claim 1, wherein
    the combination of multiple pieces of the noise reduction processing in the case where the image quality is prioritized is a combination in which the noise reduction processing relatively less likely to cause image quality deterioration is executed more times than in the case where the speed is prioritized.

11. An image processing method of executing noise reduction processing for an image by using multiple neural networks subjected to learning of results obtained by executing the noise reduction processing on images each having a predetermined noise level, the method comprising:
    obtaining information on a noise level from a processing target image;
    determining, based on the obtained information on the noise level, a combination of pieces of the noise reduction processing for the processing target image from combination data showing a combination of multiple pieces of the noise reduction processing for each of multiple noise levels, the combination data associating a parameter for the multiple noise levels with at least either a combination of neural networks to be applied in the multiple neural networks or a number of applications of the neural networks; and
    executing, based on data on the determined combination of pieces of the noise reduction processing, the noise reduction processing using at least one of the multiple neural networks for the processing target image,
    wherein combinations of multiple pieces of the noise reduction processing include a pluralities of combinations differing among a pluralities of cases where image quality is prioritized and a pluralities of cases where speed is prioritized.

12. The image processing method according to claim 11, wherein
the parameter for the multiple noise levels is information on an ISO sensitivity in capturing the image, a gain value for sensitivity correction, or a variance value of noise.

13. The image processing method according to claim 11, wherein
the number of applications of the neural networks is set so that the neural networks are applied multiple times to an image having the predetermined noise level.

14. The image processing method according to claim 11, wherein the processing target image is a partial image obtained by segmenting an input image, the method further comprising:
segmenting the input image into partial images; and
integrating the partial images on which the noise reduction processing has been executed.

15. The image processing method according to claim 14, wherein
the input image is a still image, and
each of the partial images is part of the still image.

16. The image processing method according to claim 14, wherein
the input image is a moving image, and
each of the partial images is one frame of the moving image.

17. The image processing method according to claim 11, wherein the processing target image is an image of a brightness component or each of color components obtained by separating an input image, and
wherein the method further comprises:
separating the input image into the image of the brightness component and the image of each of the color components; and
integrating the image of the brightness component and the image of each of the color components on which the noise reduction processing has been executed.

18. A non-transitory computer readable storage medium storing a program for causing a computer to perform a method of executing noise reduction processing for an image having a predetermined noise level by using multiple neural networks subjected to learning of results obtained by executing the noise reduction processing, the method comprising:
obtaining information on a noise level from a processing target image;
determining, based on the obtained information on the noise level, a combination of pieces of the noise reduction processing for the processing target image from combination data showing a combination of multiple pieces of the noise reduction processing for each of multiple noise levels, the combination data associating a parameter for the multiple noise levels with at least either a combination of neural networks to be applied in the multiple neural networks or a number of applications of the neural networks; and
executing, based on data on the determined combination of pieces of the noise reduction processing, the noise reduction processing using at least one of the multiple neural networks for the processing target image,
wherein combinations of multiple pieces of the noise reduction processing include a pluralities of combinations differing among a pluralities of cases where image quality is prioritized and a pluralities of cases where speed is prioritized.

* * * * *